(66.)

P. MUNZINGER.

Improvement in Gas Purifiers.

No. 4,707. Reissued Jan. 9, 1872.

WITNESSES

Francis D. Bastorius

John Yille

INVENTOR

Peter Munzinger

UNITED STATES PATENT OFFICE.

PETER MUNZINGER, OF PHILADELPHIA, PENNSYLVANIA, ASSIGNOR TO MORRIS, TASKER & CO.

IMPROVEMENT IN GAS-PURIFIERS.

Specification forming part of Letters Patent No. 88,326, dated March 30, 1869; reissue No. 4,707, dated January 9, 1872.

Specification describing an Improved Purifier for Gas-Works, invented by PETER MUNZINGER, of Philadelphia, in the county of Philadelphia and State of Pennsylvania.

The first part of my invention relates to building or constructing gas-purifiers in sections, whereby they can be enlarged or decreased in size, either vertically, longitudinally, or transversely. The second part of my invention relates to casting the water-cup or seal with its respective section.

Figure 1:
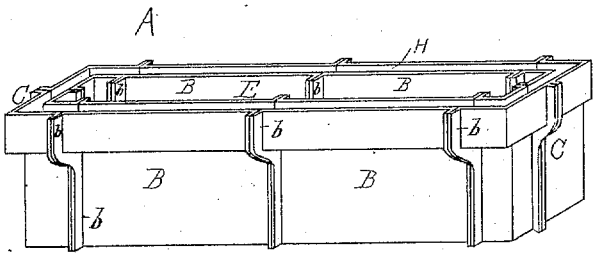
Figure 2:
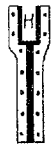
Figure 3:
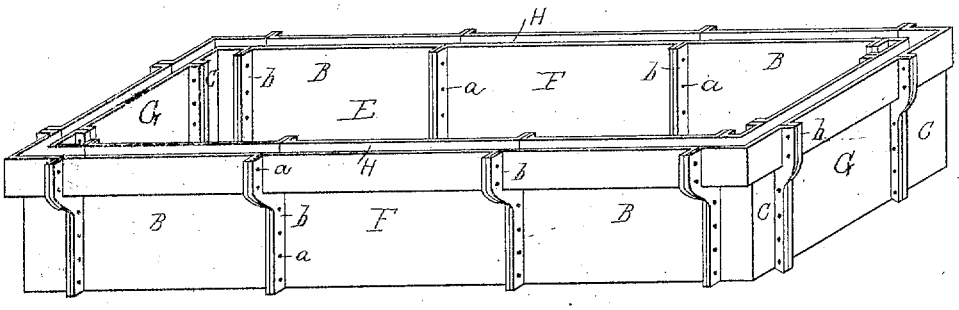

Figure 1 is a perspective view of a gas-purifier constructed in sections. Fig. 2 is a transverse section through one of the sections. Fig. 3 is a longitudinal and transverse enlargement of Fig. 1.

A, Fig. 1, is a gas-purifier, composed of the side and end sections B C, or the corner or angle pieces. The bottom has sectioned plates to correspond with the upright sections. The several sections are secured together by means of bolts, which take through the holes *a* in the outwardly and inwardly projecting flanges *b*. The flanges project from the sections so as not to interfere with the purifier-lid, the depending edges of which take into the water-cup or seal. The purifier has the usual chamber E, into which the lime-trays are received and carried by suitable ribs and projections. Should the purifier require to be enlarged longitudinally it can be accomplished by unbolting and spreading the sections B on each side and inserting the sections F, Fig. 3. By unbolting and spreading the sections or corners C at each end and inserting the sections G, Fig. 3, the purifier can be enlarged in width or transversely. Every enlargement requires additional bottom plates. The flanges or laps and butting pieces of the several sections are planed or otherwise made true to insure perfectly tight joints. The sections being of cast metal, I cast the water-cup or seal H with each section of the purifier. Heretofore it has been cast separately and bolted or otherwise secured to the purifier. By making the section and its attendant portion of the purifier-seal in one casting the cost of the purifier is very greatly reduced, and the seal is perfectly tight and free from leakage.

I have illustrated and described a method of constructing or building purifiers in sections. I wish it distinctly understood that I do not confine myself to the said way of sectioning, knowing that it may be in the province of a skilled mechanic to deviate from that shown and described and still carry out the end and design of my invention, which is making gas-purifiers in sections for the purposes of enlargement and repairing and for the greater facility of transportation.

I claim as my invention—

1. Constructing gas-purifiers in sections, substantially for the purpose shown and described.

2. The water-seal or cup cast with and forming component parts of the respective sections.

PETER MUNZINGER.

Witnesses:
FRANCIS D. PASTORIUS,
JOHN YILLE.

(66)